United States Patent [19]

Knoth

[11] Patent Number: 4,475,938

[45] Date of Patent: Oct. 9, 1984

[54] CUTTING DEVICE FOR SECTIONING LIQUID GLASS STRAND

[75] Inventor: Werner D. Knoth, Essen, Fed. Rep. of Germany

[73] Assignee: Veba-Glas AG, Essen, Fed. Rep. of Germany

[21] Appl. No.: 449,009

[22] PCT Filed: Feb. 12, 1982

[86] PCT No.: PCT/EP82/00026

§ 371 Date: Nov. 29, 1982

§ 102(e) Date: Nov. 29, 1982

[87] PCT Pub. No.: WO82/03384

PCT Pub. Date: Oct. 14, 1982

[30] Foreign Application Priority Data

Apr. 2, 1981 [DE] Fed. Rep. of Germany ....... 3113303

[51] Int. Cl.³ .............................................. C03B 7/12
[52] U.S. Cl. ...................................... 65/334; 65/332; 83/601; 83/646
[58] Field of Search ......................... 65/332, 334, 324; 83/597, 646, 601, 602, 580, 600, 623

[56] References Cited

U.S. PATENT DOCUMENTS

| | | |
|---|---|---|
| 1,568,531 | 1/1926 | Reynolds .......................... 65/334 X |
| 2,271,271 | 1/1942 | Meyers .................................... 65/334 |
| 3,736,826 | 6/1973 | Ward .................................. 83/526 X |
| 3,954,033 | 5/1976 | Tipton ............................... 83/580 X |
| 4,214,497 | 7/1980 | Dahms ............................. 65/334 X |
| 4,374,659 | 2/1983 | Davey ................................... 65/334 |

FOREIGN PATENT DOCUMENTS 715492  8/1965  Canada ................................. 65/332
2324861 12/1974 Fed. Rep. of Germany .

*Primary Examiner*—Robert L. Lindsay, Jr.
*Attorney, Agent, or Firm*—Karl F. Ross; Herbert Dubno

[57] ABSTRACT

The invention relates to a cutting device for the sectioning of a liquid glass strand into individual fragment (gobs) to be further processed into hollow glass articles. In order to achieve a trouble-free cutting process as well as a relatively small mass of the parts moved during the cutting, combined with an increase in the production rate, the invention proposes a cutting device having a housing (2) in which a cutting unit (3) is formed by several partially overlapping cutting elements (4) disposed around the glass strand (5) which are rotatably journaled at one of their ends and connected to the planet gears 7 of a planetary gearing whose outer ring gear (8) is connected with a drive. The cutting edges of the cutting elements (4) are of curved shape.

10 Claims, 6 Drawing Figures

CUTTING DEVICE FOR SECTIONING LIQUID GLASS STRAND

CROSS REFERENCE TO RELATED APPLICATIONS

This application is a national phase application corresponding to PCT/EP82/100026 filed Feb. 12, 1982 and based upon German application P3113 303.7 filed Apr. 2, 1981 under the International Convention.

FIELD OF THE INVENTION

The invention relates to a cutting device for the sectioning of a liquid glass strand into individual fragments (gobs) for further processing into hollow glass articles.

BACKGROUND OF THE INVENTION

The object of such a cutting device is to section the flowing, i.e. moving glass strand by a mechanical cutting operaton. The problem resides in the fact that the temperature of the liquid glass is relatively high so that the cut has to be performed quickly in order to avoid unacceptable heating of the cutting device. This rapid action also is necessary because otherwise the glass strand issuing from the feeding device would become congested. In addition the cut has to be performed neatly so that no glass fibers are pulled or dirtying of the glass occurs.

It is known to use cutting devices for this purpose whose cutting elements are disposed on scissor arms and move in opposite directions while performing the cut. These shear blades are driven mechanically via cam disks, electrically by way of eccentrics or pneumatically by appropriate means.

The disadvantage of this known shear structure is that the glass strand is virtually hacked through, i.e. a quick hit occurs from two sides, which together with the angular shape of the cutting elements cause the glass strand to be separated in a jerky manner. If the glass temperature and thus the deformation properties of the glass are not constant over the cross-sectional area, the resistance to be overcome by the two scissor blades is not exactly the same. Consequently, the penetration speed of one blade changes relatively to that of the other blade so that the glass strand is pressed into the direction of easier deformability. This results in a throw-off of the glass strand or the separated fragments in that direction. As a result the processing on the machine designed to receive the separated fragment becomes much more difficult. Another disadvantage of the known shear structure is the relatively large mass which must be moved with every cut. Thus, limits are imposed a priori upon an increase in the production speed.

SUMMARY OF THE INVENTION

In order to avoid these disadvantages, the invention proposes a cutting device having a housing or the like in which several partially overlapping cutting elements constituting a cutting unit are disposed around the glass strand and are each rotatably journaled at one end and connected with a planetary gearing or the like whose outer ring gear is connected with a drive. The cutting elements of a cutting unit thus execute a combined motion, namely on the one hand concentric from the outside to the center of the glass strand and on the other hand a pulling motion analogous to that of a knife cut. The cutting speed can be relatively high since the masses to be moved are kept low. The course of the cut is controlled in time according to the path traversed by the cutting elements and to their speed.

Advantageously, the cutting edges of the cutting elements are of curved shape, which can be either concave or convex.

The curvature of the cutting elements is so shaped and they are so arranged that the range of motion extends from total disengagement of the glass strand to its sectioning, i.e. to slightly past the central axis of the glass strand.

The cutting elements can consist of disk-shaped ring segments, but it is also possible to give them an elliptical shape.

One housing can contain several cutting units so that it is possible to cut several glass strands parallel to one another. The cutting units of a cutting device can have a commmon drive acting upon toothed rack which in turn meshes with the outer ring gear of the planetary gearings.

Hydraulic rotary pistons can be used as drives for several cutting units.

The hydraulic drives are actuated through switching valves or the like which are monitored by a computer and processor preloaded with specific data to achieve an optimum finishing process.

The cutting device according to the invention executes a motion similar to the diaphragm of an optical device.

The utilization of hydraulic drives yields an unusually high precision of the course of the motion, high accelerations on start-up and short braking paths upon a stopping of the moving parts. A damping with dissipation of energy is no longer required, thus resulting in the possibility of further energy-saving speed increases in the course of the motions. The fire hazard is practically eliminated since there is no longer an escape of compressed air that can turn local ignition into a real conflagration.

It is known to cool and lubricate cutting devices consisting of shear-shaped cutting elements with a liquid medium, mostly water with additives, in such a manner that the liquid is sprayed onto both scissor blades from above or from below. The essential drawback of this cooling method is that, e.g. on spraying from below, the hot ceramic parts of the superjacent feeding device are quenched at the same time which results in a continuous destruction of these ceramic parts. A further disadvantage of this way of cooling of the cutting elements is that the liquid medium runs directly into the molds of the following processing machine or over the existing distribution and channel systems. An uncontrolled cooling effect as well as chemical reactions are caused in the machine itself by the entry of the cooling agent. In order to improve the actual cutting process, the use of shears with three or more cutting elements has been proposed. These have to be cooled and lubricated in the same manner, which proves relatively cumbersome.

In accordance with the present invention the housing of the cutting device is closed and in its inner surface surrounding the glass strand, within the motion range of the cutting elements, a throughgoing slot is provided for them and on its outer surfaces connections are provided for the supply and removal of a coolant and/or lubricant as well as a sealed passage for the drive member of the cutting elements.

In this manner the escape of the cooling and/or lubricating medium is limited to a minimum while, furthermore, the medium itself is led in a closed circuit so that losses are largely avoided.

BRIEF DESCRIPTION OF THE DRAWING

Embodiments of the invention are further described with reference to the drawings in which in schematic presentation show.

SPECIFIC DESCRIPTION

Figure 1:
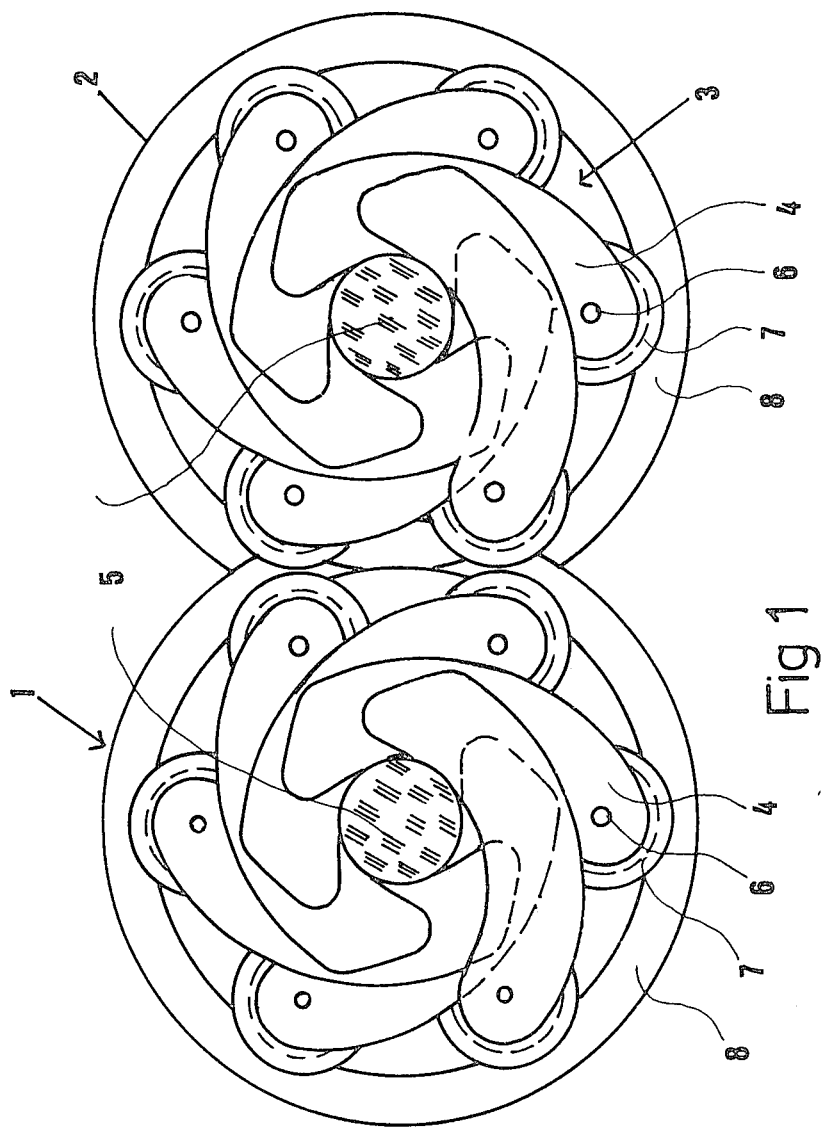
FIG. 1 is a a top view of a cutting device with ring-segmental cutting elements.

In the cutting device 1 according to FIGS. 1-4 a housing 2 receives several cutting elements 4 are arranged in a partially overlapping manner, forming a cutting unit 3. The cutting elements 4 each surround a glass strand 5 which passes centrally through each cutting device 1.

In this embodiment a double glass strand for the production of double gobs has been illustrated. The cutting elements 4 are each rotatably journaled at one of its ends by shafts or pin driven by planet gears 7 which mesh with the outer ring gears 8.

The cutting edges of the cutting elements 4 are of curved shape. This shape can be either concave or convex. The configuration and the arrangement of the cutting elements 4 is so designed that the range of motion of the cutting elements 4 extends from complete disengagement from the glass strand 5 to their complete sectioning.

Figure 2:
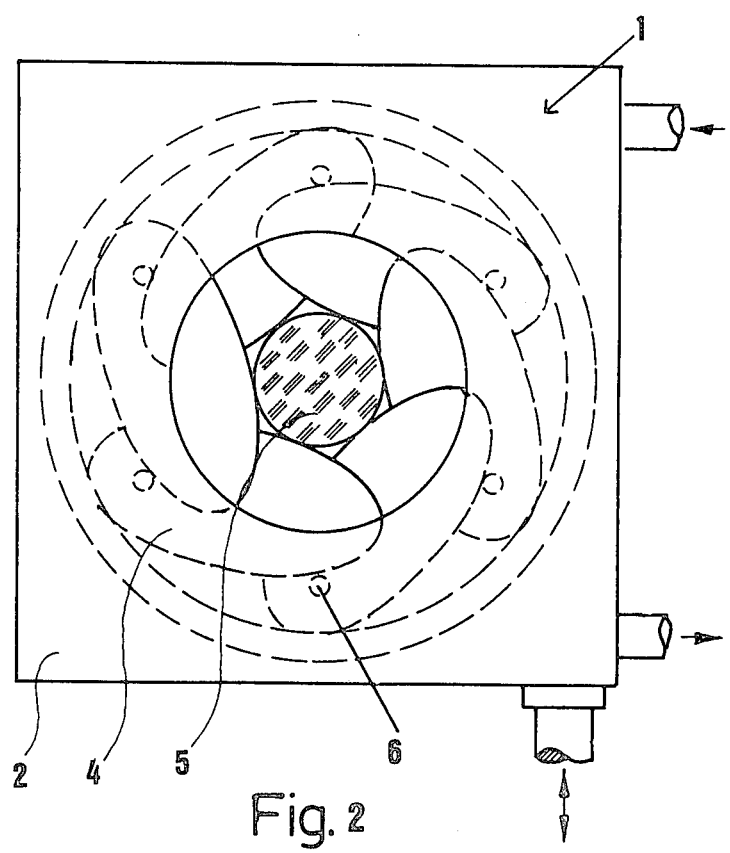
FIG. 2 is a top view of a cutting device with elliptical cutting elements.

In the embodiment of FIG. 1 the cutting elements 4 consist of plate-shaped ring segments, whereas in the embodiment of FIG. 2 approximately elliptical cutting elements 4 are provided.

Figure 3:
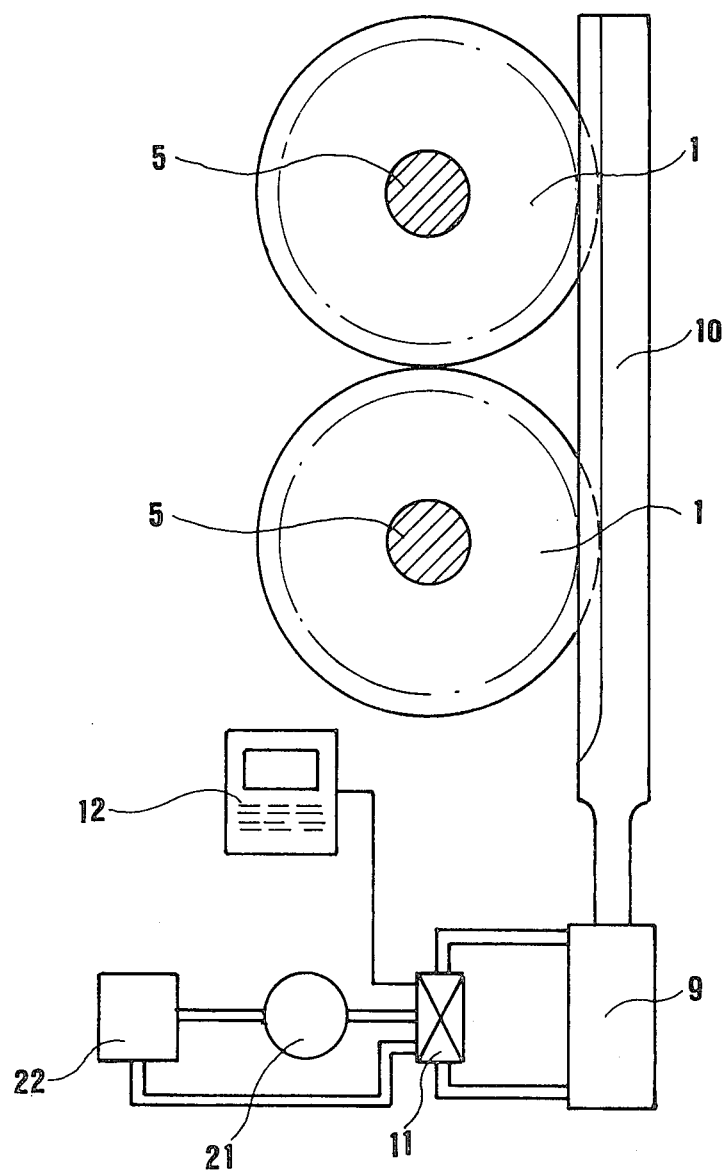
FIG. 3 is a plan view of a cutting device with a drive.

As illustrated in FIG. 3, the cutting units 3 can have a common drive in the shape of an axial-piston unit 9 in operation a toothed rack 10 which in turn meshes with the ring gears 8 of the cutting devices 1.

The hydraulic axial-piston unit 9 is controlled through the valve 11 and the electronic computer and processor 12.

Figure 4:
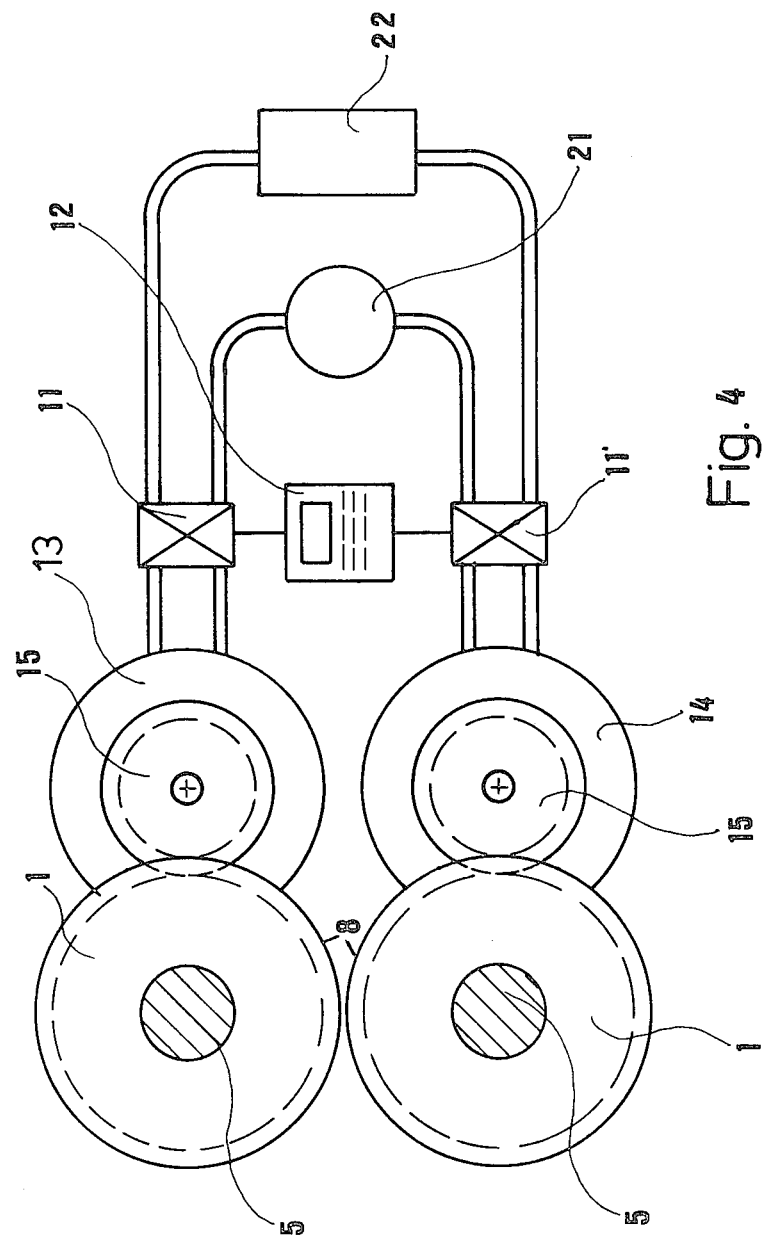
FIG. 4 is a plan view of a cutting device for two glass strands.

In the embodiment of FIG. 4 separate drives consisting of hydraulic rotary pistons 13, 14 are provided for the cutting devices 1.

These act directly through transmissions 15 upon the ring gears 8 of the cutting devices 1.

The hydraulic rotary pistons 13, 14 are actuated by switching valves 11, 11' which are controlled by the computer and processor 12.

Figure 5:
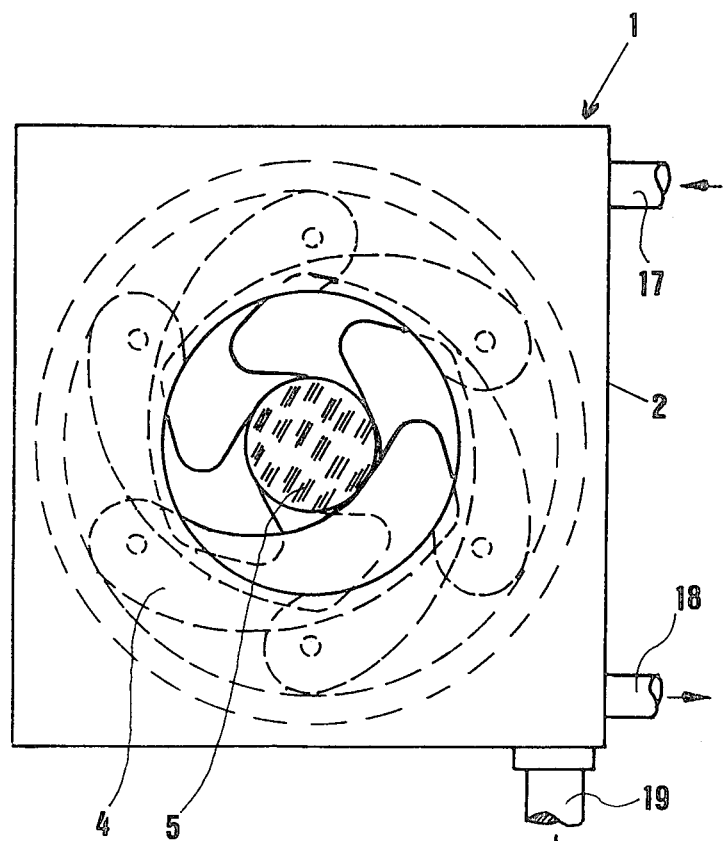
FIG. 5 is a top view of a cutting device with connections for cooling and lubricating.
Figure 6:
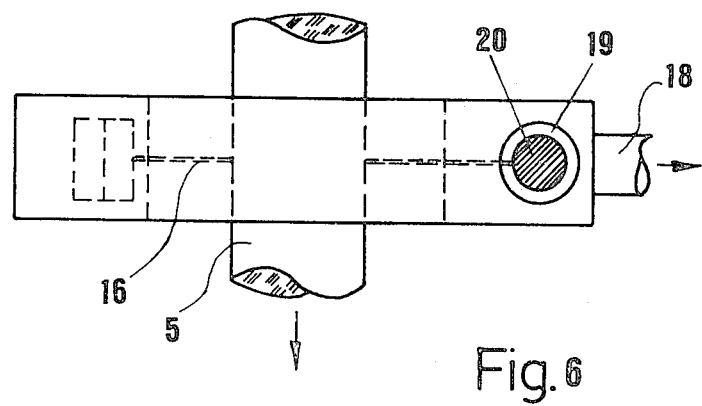
FIG. 6 is a side view of FIG. 5.

In FIGS. 5 and 6 the facility for cooling and/or lubricating the cutting device 1 can be seen. For this purpose the housing 2 is closed. The glass strand 5 to be cut passes centrally through the housing. The cutting elements 4 are located partially within the housing 2 and partially in the free space between the glass strand 5 and the housing 2. The cutting elements 4 emerge from the slots 16 to reach the strand 5 as clearly shown in FIG. 6. The housing 2 is provided on its outer side with connections 17, 18 for the supply and the removal of a coolant and/or lubricant as well as with a sealed passage 19 for the drive member 20 of the cutting elements 4.

A pump 21 as well as a collecting tank 22 are also part of the hydraulic drive.

I claim:

1. A cutting device for the sectioning of a liquid glass strand of circular peripheral curvature into individual gobs for processing into hollow glass articles, said cutting device comprising:

a housing having an opening traversed by said strand;

a plurality of partially overlapping elongated cutting elements disposed around said strand, each of said cutting elements being pivoted only at one end thereof in said housing and having a curvature turned toward said glass strand different from the circular curvature thereof, said cutting elements being uniformly spaced around said strand so that as they pivot about respective pivot axes at the respective said one end of each cutting element, said cutting elements slice through said strand completely and upon pivoting in an opposite sense are withdrawn completely from engagement with said strand;

a respective planetary gear rotatable about the pivot of each of said elements and coupled therewith at the respective said one end thereof for rotating the respective element;

a ring gear in said housing rotatable about said strand and meshing with all of said planetary gears; and means for rotating said ring gear in said housing to swing all of said elements in one sense or an opposite sense simultaneously.

2. The cutting device defined in claim 1 wherein said cutting elements have cutting edges engaging said strand which are convex in the direction of said strand.

3. The cutting device defined in claim 1 wherein said cutting elements are ring segments.

4. The cutting device defined in claim 2 wherein said cutting elements are of elliptical shape.

5. The cutting device defined in claim 1 wherein said housing is traversed by a number of strands and a respective array of such cutting elements, planetary gears and ring gears is provided for each of said strands in said housing.

6. The cutting device defined in claim 5, further comprising a toothed rack meshing with all of said ring gears.

7. The cutting device defined in claim 6, further comprising a hydraulic axial-piston unit operatively connected to said rack for displacing same.

8. The cutting device defined in claim 6, further comprising respective hydraulic rotary piston units connected to said ring gears for displacing same.

9. The cutting device defined in claim 1 wherein the means for displacing said ring gear is a hydraulic drive, further comprising at least one switching valve for controlling said drive and a computer and processor for controlling said switching valve.

10. The cutting device defined in claim 1 wherein said housing is formed with slits turned toward said opening, said cutting elements being slidable through said slits, said housing being formed with a space around said elements inwardly of said slits, said housing being further provided with connections for the supply and removal of a coolant.

* * * * *